(12) United States Patent
Ellis et al.

(10) Patent No.: US 6,813,447 B2
(45) Date of Patent: Nov. 2, 2004

(54) RECOVERY OF CLOCK PULSES OF WAVELENGTH DIVISION MULTIPLEXED OPTICAL SIGNALS

(75) Inventors: Andrew D. Ellis, Ipswich (GB); Dmitri V. Kuksenkov, Painted Post, NY (US); Shenping Li, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/153,957

(22) Filed: May 23, 2002

(65) Prior Publication Data

US 2003/0219258 A1 Nov. 27, 2003

(51) Int. Cl.⁷ .................. H04B 10/00; H01S 3/067; H01S 3/083
(52) U.S. Cl. .............. 398/155; 372/6; 372/94
(58) Field of Search .................. 398/155; 372/6, 372/94, 25, 30, 70, 72

(56) References Cited

U.S. PATENT DOCUMENTS

| 5,742,415 | A | * | 4/1998 | Manning et al. | ............ 398/155 |
| 5,959,753 | A | * | 9/1999 | Duling et al. | ............ 398/155 |
| 6,614,582 | B1 | * | 9/2003 | Mikkelsen et al. | ......... 398/155 |
| 6,646,785 | B2 | * | 11/2003 | Kuksenkov | .............. 372/72 |
| 2001/0038481 | A1 | * | 11/2001 | Li et al. | ................. 359/158 |
| 2001/0053008 | A1 | * | 12/2001 | Ueno | ...................... 359/158 |
| 2002/0163710 | A1 | * | 11/2002 | Ellis | ......................... 359/333 |
| 2003/0194240 | A1 | * | 10/2003 | Mollenauer et al. | ........ 398/155 |

OTHER PUBLICATIONS

Su, Y. et al, "Wavelength–tunable all–optical clock recovery using a fiber–optic parametric oscillator", Optics Communications, North–Holland Publishing Co., Amsterdam, NL, vol. 184, No. 1–4, pp. 151–156, Oct. 1, 2000.

Wang, L. et al, "All–optical laser synchronization and clock recovery based on dynamic parametric gain modulation", vol. 37, No. 3, Mar. 7–10, 2000, pp. 235–237.

Deparis, O. et al, "Actively mode–locked Er–doped fiber laser incorporating Bragg gratings written in polarization-–maintaining fiber", Proc. SPIE vol. 4354, Jun. 26–30 2000, pp. 171–179.

Horowitz, M. et al, "Theoretical and experiment study of harmonically modelocked fiber lasers for optical communication systems", Journal of Lightwave Technology, IEEE, NY, vol. 18, No. 11, Nov. 2000, pp. 1565–1574.

OTHER PUBLICATIONS

Primary Examiner—Don Wong
Assistant Examiner—James Menefee
(74) Attorney, Agent, or Firm—Ronald J. Paglierani

(57) ABSTRACT

Apparatus for recovering clock pulses of wavelength division multiplexed optical signals passed therethrough. The apparatus comprises an optically-pumped laser cavity defining a cavity length and comprising a nonlinear medium pumped at a wavelength selected to give efficient parametric amplification within said medium. The cavity length corresponds to an integer multiple of bit periods of at least one of the multiplexed optical signals. The optical signals copropagate through the medium with the pump radiation. The apparatus further comprises an optical path for recirculating a proportion of the output from the laser cavity back through the laser cavity. In this way, idler waves are generated symmetrically about the pump wavelength by four wave mixing with the at least one of the multiplexed optical signals and recirculated through the laser cavity to be amplified by parametric amplification in order to recover wavelength division multiplexed clock pulses.

40 Claims, 3 Drawing Sheets

OTHER PUBLICATIONS

Serkland, D. et al, "*Tunable fiber–optic parametric oscillator*", Optics Letters, vol. 24, No. 2, Jan. 15, 1999, pp. 92–94.

Ho, M–C, et al, "*Narrow–linewidth idler generation in fiber four–wave mixing and parametric amplification by dithering two pumps in opposition of phase*", Journal of Lightwave Technology, IEEE, NY, vol. 20, No. 3, Mar. 2002, pp. 469–476.

Hedekvist, P. et al, "*Fiber four–wave mixing demultiplexing with inherent parametric amplification*", Journal of Lightwave Technology, IEEE, NY, vol. 15, No. 11, Nov. 1, 1997, pp. 2051–2058.

Yikai, Su et al, "*Simultaneous 3R regeneration and wavelength conversion using a fiber–parametric limiting amplifier*", Optical Fiber Communication Conference. (OFC). Technical Digest Postconference Edition, Anaheim, CA, Mar. 17–22, 2001. Trends In Optics and Photonics Series. TOPS, vol. 54, Washington, WA, vol. 1 of 4, 2001, pp. MG41–MG43.

Ouellette, F., "*Dispersion cancellation using linearly chirped Bragg grating filters in optical waveguides*", Optics Letters, Optical Society of America, Washington, vol. 12, No. 10, Oct. 1987, pp. 847–849.

O'Connor, M. V. et al, "*Fibre–laser–pumped femtosecond PPLN optical parametric oscillator*", LEOS 2001, $14^{th}$. Annual Meeting of the IEEE Lasers & Electro–Optics Society, San Diego, CA, Nov. 11–15, 2001, Annual Meeting of the IEEE Lasers and Electro–Optics Society, NY, IEEE, US, vol. 1 of 2, Nov. 14, 2001, pp. 756–757.

Min–Yong Jeon et al, "*All–optical demultiplexing scheme based on an optical parametric loop mirror*", Technical Digest, Post Conference Edition, Cleo '99, Conference on Lasers and Electro–Optics, May 23–28, 1999, pp. 300–301.

W.A. Pender et al, Error free operation of a 40 Gbit/s all–optical regenerator, Electronics Letters, Mar. 14, 1996, vol. 32, #6, pp. 567–569.

C.R. Giles et al, All–Optical Regenerator, Electronics Letters, Jul. 7, 1988 vol. 24 #14, pp. 848–850.

\* cited by examiner

RECOVERY OF CLOCK PULSES OF WAVELENGTH DIVISION MULTIPLEXED OPTICAL SIGNALS

BACKGROUND OF THE INVENTION

1. Field of the Invention

This invention is directed to recovering clock pulses of wavelength division multiplexed optical signals and to regeneration of wavelength division multiplexed optical signals. In particular, it relates to simultaneous clock recovery and regeneration of many wavelength division multiplexed optical signals.

2. Technical Background

As the capacity of wavelength division multiplexed (WDM) transmission systems increases in response to the increasing demand for communication, the maximum reach of each transmission system is diminished. Regenerators are therefore required at regular intervals along a transmission link in addition to any regenerators associated with network nodes where traffic routing takes place. It may be argued that regenerators are necessary within switching nodes to provide traffic routing and grooming functions, though this is not always the case when traffic on a given wavelength is routed straight through the node. However, the use of regenerators between nodes increases the network cost without contributing additional functionality. A cost-effective means of regenerating WDM signals is therefore required as an alternative to full WDM demultiplexing and opto-electronic regeneration. System manufacturers indicate that this is particularly necessary for 40 Gbit/s data rate systems with a target reach of 3000 km but a practical transmission limit around 1500 km.

All-optical regenerators which provide for the individual regeneration of each wavelength in a WDM system have been proposed (see, for example, Electronics Letters vol 32 no. 6, pp567, 1996 "Error free operation of a 40 Gbit/s all-optical regenerator" by Pender, Widdowson, Ellis; Electronics Letters vol 24 no. 14, pp848, 1998 "All-optical regenerator" by Giles, Li, Wood, Burrus, Miller). However, such systems require the WDM signals to be demultiplexed, after which each channel is processed by a respective optical regenerator. Such single channel fiber-based regenerators may perform clock recovery using a fiber ring laser mode-locked through cross-phase modulation or non-linear polarization rotation and a decision gate based on similar non-linear properties. The output wavelength is determined by the local pulse source in the ring laser section and is in general substantially different to the incoming wavelength. It is well known that the non-linearity of optical fibers is broadband, and so the device is tunable over a large wavelength range. However, since the device is based on cross-phase modulation or its derivative effect, non-linear polarization rotation, attempts to operate with several wavelengths simultaneously inevitably result in unwanted crosstalk between the channels through the same cross-phase modulation effects.

It has also been suggested that RZ (return to zero) formatted WDM signals may be simultaneously regenerated using soliton transmission and synchronous modulation. However, in this scheme it is necessary to ensure that all WDM signals arrive at the synchronous modulator with the same phase. This offers many practical difficulties arising from different clock sources, different propagation paths and small-scale drift of laser wavelengths coupled with residual dispersion. These difficulties are exaggerated when a wavelength-routed network is contemplated, and the requirements of soliton transmission are taken into account.

Therefore there is a need for an improved method and apparatus for use in all-optical clock recovery and signal regeneration, which can simultaneously process a plurality of WDM signals.

BRIEF SUMMARY OF THE INVENTION

According to a first aspect of the invention, there is provided an apparatus for recovering clock pulses of wavelength division multiplexed optical signals passed therethrough. The apparatus comprises an optically-pumped laser cavity defining a cavity length and comprising a nonlinear medium pumped at a wavelength selected to give efficient parametric amplification within the medium. The cavity length corresponds to an integer multiple of bit periods of at least one of the multiplexed optical signals. The optical signals co propagate through the medium with the pump radiation. The apparatus further comprises an optical path for recirculating a proportion of the output from the laser cavity back through the laser cavity. In this way, idler waves are generated symmetrically about the pump wavelength by four wave mixing with the at least one of the multiplexed optical signals and recirculated through the laser cavity to be amplified by parametric amplification in order to recover wavelength division multiplexed clock pulses.

By pumping the dispersion-shifted nonlinear medium to give efficient parametric amplification, the input data signals interact efficiently with the pump to generate corresponding wavelength converted signals symmetrically spaced either side of the pump. At other non-symmetric wavelengths, group velocity dispersion destroys the phase matching, and results in a weak four wave mixing interaction. Depending on the relative phase of the pump and the symmetrically placed signals, the latter may extract energy from the pump by parametric amplification. Recirculation of the idler waves through the laser cavity enables generation of further idler waves where data pulses may have been absent during previous recirculations, so recovering wavelength-converted clock pulses.

The cavity may be formed between a plurality of reflectors, at least one of which reflectors is a wavelength-selective reflector which is partially reflective at the wavelength of at least one of the idler waves for partially reflecting such idler waves back through the cavity after passage through the cavity. In this way, a proportion of the wavelength converted clock pulse radiation may be recirculated through the cavity with the correct phase, to ensure strong parametric amplification of the idler waves (as described above) and recovery of clock pulses.

Alternatively, the cavity may be formed in a ring laser or a sigma laser configuration. Use of a ring laser configuration overcomes the disadvantages arising from non-linear effects and formation of sub-cavities by reflections inherent in linear cavity configurations.

Preferably, the apparatus further comprises a filter to prevent further transmission of radiation at the pump and signal wavelengths after passage through the nonlinear medium. The filter may comprise a band pass filter within the optical cavity. By blocking the pump and signal wavelengths after passage through the dispersion-shifted medium, one is left with idler waves corresponding to data pulses of the optical signal. Without a means to prevent further transmission of radiation at the pump and signal wavelengths after passage through the nonlinear medium, the recirculated pump and signals would need to be in phase.

Preferably, the apparatus further comprises an adjuster for adjusting the cavity length to correspond to an integer multiple of bit periods of at least one of the multiplexed signals. An adjuster would be required for apparatus using longer cavity lengths where environmental fluctuations are sufficient to induce a measurable change in cavity length. The adjuster may comprise an adjustable fiber delay line. This would provide sufficient phase matching accuracy for a short cavity.

Preferably, the adjustable fiber delay line is actively stabilised to compensate for environmental fluctuations in the cavity.

Preferably, the cavity further comprises dispersion slope compensation. This enables correct cavity length adjustment for a greater range of simultaneous signal wavelengths. Preferably, the dispersion slope compensation has mirror image dispersion characteristics to those of the nonlinear medium, Suitably, the dispersion slope compensation comprises dispersion-compensating fiber. Alternatively, the dispersion slope compensation and band-pass filter comprise at least one fiber grating, and may include a number of gratings per wavelength.

Preferably, the residual dispersion after dispersion compensation is not zero, and the cavity length at each idler wavelength is equal to an integer multiple of bit periods. Preferably, the coherence length of the signals is substantially greater than the cavity length, to ensure correct optical phase matching and maximise phase-sensitive gain.

The filter to prevent further transmission of radiation at the pump and signal wavelengths after passage through the nonlinear medium may comprise an optical branch presenting a series of cascaded chirped fiber Bragg gratings, the optical branch being connected to the optical cavity by an optical circulator, whereby each chirped fiber Bragg grating reflects a different idler wavelength back into the cavity. Each chirped fiber Bragg grating reflects a corresponding recovered channel clock while passing light at all other wavelengths, including the pump, WDM optical signals, amplified spontaneous emissions, four wave mixing terms etc. Furthermore, each grating defines a unique laser cavity length for its reflected wavelength, so that for multi-wavelength operation there is no need to have total cavity dispersion equal to zero.

Preferably, each chirped fiber Bragg grating is at least half as long as the physical spacing of two successive optical pulses in the fiber following at the signal clock rate. In this case, reflection from one end of the grating is delayed with respect to the reflection from the other end of the grating by a full bit period, and phase change of +/−180° for the recovered clock signal can be attained by a wavelength shift.

The phase of the pump radiation may be modulated at the frequency of circulation of one of the optical signals through the cavity or an integer multiple thereof up to the bit rate of one of the optical signals, to suppress stimulated Brillouin scattering.

Preferably, the cavity further comprises an optical filter with a free spectral range equal to the clock frequency or a subharmonic of the signal clock frequency to select only one or a limited subset of supermodes, so suppressing supermode noise.

Preferably, the cavity further comprises a weak periodic filter with a free spectral range substantially equal to the wavelength spacing between adjacent channels. In combination with self phase modulation induced spectral broadening, the spectral compression offered by the filter will tend to stabilise the pulse amplitudes of different channels, so reducing the effects of any saturation induced crosstalk which might otherwise arise if two clock pulses are present simultaneously. Alternatively, other forms of amplitude stabilisation may be employed, such as non-linear polarization rotation or 2R regeneration, to reduce the amplitude destabilising effects.

Preferably, the optical cavity comprises polarization-maintaining fiber. The polarization sensitivity of the parametric gain would then ensure that the recovered clock polarization was matched to the incoming signal polarization. Preferably, the axes of the fiber are swapped at regular intervals to reduce walkoff.

Preferably, the pump wavelength lies between two adjacent standard channel wavelengths. More preferably, the pump wavelength lies mid-way between the two adjacent wavelengths. The input signals may correspond to even-numbered standard channel wavelengths with the recovered clock channels corresponding to odd-numbered standard channel wavelengths or vice versa, and the input signals may be separated from recovered clock signals using optical interleavers.

Alternatively, the signals may be located within a band of width N, which band is offset from the pump wavelength by a spacing of at least 2N.

The nonlinear medium may comprise dispersion-shifted fiber, a semiconductor optical amplifier or a periodically-poled lithium niobate (PPLN).

In a second aspect, the invention provides a multi-wavelength optical regenerator for recovering and re-timing wavelength division multiplexed optical signals, the regenerator comprising apparatus for recovering clock pulses of WDM optical signals as above, wherein wavelength division multiplexed optical signals and the recovered clock pulses are coupled to a further optically-pumped amplifier comprising a nonlinear medium pumped at a wavelength selected to give efficient parametric amplification within the medium, whereby the optical signals and the recovered clock pulses are modulated by each other.

Preferably, the regenerator comprises a filter to prevent further transmission of radiation at the pump and signal wavelengths after passage through the cavity and further amplifier, leaving only the modulated recovered clock signal. Alternatively, the regenerator comprises a filter to prevent further transmission of radiation at the pump and recovered clock wavelengths after passage through the cavity and further amplifier, leaving the original optical data signal modulated by the recovered clock.

According to a third aspect of the invention, there is provided a method for recovering clock pulses of wavelength division multiplexed optical signals. This method comprises the steps of providing a laser cavity defining a cavity length and comprising a nonlinear medium, optically-pumping the laser cavity at a wavelength selected to give efficient parametric amplification within the medium, and copropagating the optical signals through the nonlinear medium with the pump radiation. The method further comprises the steps of recirculating a proportion of the output from the laser cavity back through the laser cavity, and adjusting the cavity length to correspond to an integer multiple of bit periods of at least one of the multiplexed optical signals. In this way, idler waves are generated symmetrically about the pump wavelength by four wave mixing with the at least one of the multiplexed optical signals and amplified by parametric amplification in order to recover wavelength division multiplexed clock pulses.

The idler waves may be partially reflected back through the cavity.

Preferably the optical signal is subject to excess self phase modulation within the cavity. In this way, each recovered clock may slightly adjust its operating wavelength and hence (through residual cavity or grating dispersion) the effective cavity length, and so relative phase, to ensure maximum gain.

Suitably, the method further comprises compensating signal chromatic dispersion within the cavity.

Preferably the net small signal gain through the cavity is less than one. In this way, any signals generated by spontaneous processes within the cavity and through parametric amplification of incoming amplified spontaneous emissions, will be reduced with each re-circulation through the cavity. Preferably, the net large signal gain will be greater than or equal to one. In this regard, large signals would comprise the recovered clock signals and small signals would comprise any signals having half the intensity or less than the large signals.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention, and together with the description serve to explain the priciples and operation of the invention.

DETAILED DESCRIPTION OF THE INVENTION

Figure 1:
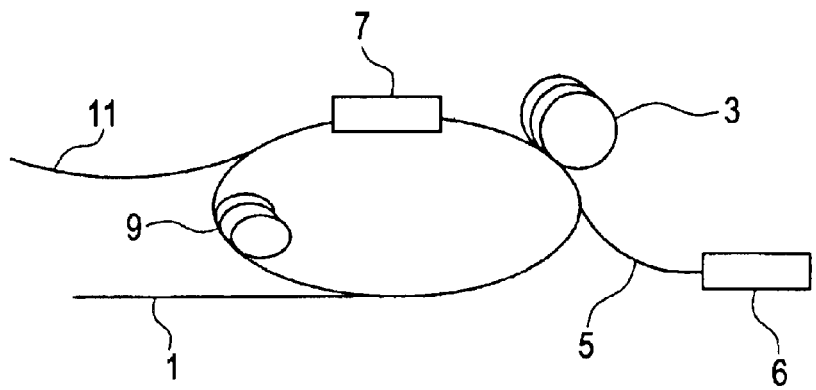
FIG. 1 is a schematic diagram of a parametric amplifier-based ring laser clock recovery circuit.

The clock recovery circuit as illustrated in FIG. 1 comprises a signal input fiber 1 coupled to a length of around 500 m of dispersion-shifted nonlinear medium comprising highly non-linear dispersion-shifted fiber 3 by a wavelength division multiplexer (not shown). A pump input fiber 5 pumped by a laser 6 is also coupled to the dispersion-shifted fiber 3 by a second wavelength division multiplexer (not shown). The output from the dispersion-shifted fiber 3 is fed to a band-pass filter 7, and the output from the band-pass filter branches into two paths. A first path from the band-pass filter 7 is coupled to an adjustable fiber delay line 9 comprising dispersion-compensating fiber having the opposite dispersion characteristics to those of the dispersion-shifted fiber 3. After the fiber delay line 9, the first path is coupled back to the signal input fiber to complete a ring laser configuration. The second path from the band-pass filter comprises a clock output fiber 11.

The pump input fiber feeds pump radiation into the length of dispersion-shifted fiber at the wavelength of zero-dispersion. This wavelength is selected because it ensures efficient parametric amplification within the fiber for signals symmetrically spaced either side of the wavelength of zero dispersion. On start up, RZ WDM data signals are fed to the signal input fiber 1, and these pass into the dispersion-shifted fiber 3. As the pump radiation and data signals pass through the dispersion-shifted fiber, new signals known as idler waves are generated symmetrically about the pump wavelength by the process of four-wave mixing. Each pulse of these idler waves corresponds to a data one of one of the original data signals, while no pulse is generated for a data zero. As the signals and idler waves continue to travel through the dispersion-shifted fiber 3, they are each subject to parametric amplification from the pump. After passage through the dispersion-shifted fiber 3, the remaining pump radiation and WDM data signals are blocked from further transmission by the band-pass filter 7, while the idler waves pass unhindered through the filter. A proportion of the idler wave radiation passes along the first path from the band-pass filter through the adjustable fiber delay line 9 and is re-introduced into the signal input fiber 1. The remainder of the idler wave radiation passes along the second path from the band-pass filter to the clock output fiber 11.

By suitable adjustment of the fiber delay line 9, the idler waves passing along the first path from the band-pass filter 7 return to the signal input fiber 1 in phase with the WDM data signals fed to the signal input fiber. As the idler waves and data signals now pass through the dispersion-shifted fiber 3, the existing idler waves are strongly parametrically amplified by the pump radiation as well as by the incoming data signal in the case of a data one. Furthermore, where idler waves have not previously been generated, they are generated as described above by the ones within the incoming data signal. In this way, a mode-locked ring laser is formed, where the cavity gain is strongly modulated by the temporal profile of the incoming data, and the re-circulating clock pulses are distinguished from spontaneous noise through phase-sensitive parametric amplification and other nonlinear processes within the cavity.

Parametric amplification is phase sensitive, and it is necessary to ensure that the phase of the recovered clock lines up at the input to the amplifier after each recirculation. In order to achieve this, it is necessary to have well defined phase relationships between the data and pump signals, which in practice implies that each of the signals should be well defined in terms of phase. This translates to a requirement that the coherence length of the signals be longer than several recirculations of the clock recovery loop. Faster phase variations will destroy the phase matching condition of the cavity, whilst significantly slower phase variations may be tracked by the clock recovery laser automatically adjusting its phase. In practice, for a 1 km cavity, a continuous wave (pump) linewidth of somewhat less than 20 kHz would be required to give a 10 km coherence length. Similar constraints apply to the data signal, where the phase noise contribution of any in-line optical amplifiers should be taken into consideration. In this case, provided the ASE induced phase noise is small ($<\delta\pi$) the ring laser will sample the average phase. This may however set a more stringent upper limit on regenerator spacing than considerations of amplitude noise.

To ensure that the re-circulating idler waves return to the signal input fiber 1 in phase with the incoming data signals, the cavity length should correspond to an integer multiple of bit periods of each of the multiplexed signals (accurate to 1% of a bit period). For a sufficiently short cavity this may be achieved with sufficient accuracy simply by adjusting the cavity length to match the central channel using the adjustable fiber delay line 9. In this respect, a sufficiently short cavity is one where the cavity length L meets the following requirement:

$$L << \frac{\tau}{2D'N_{ch}}\left(\frac{c}{\lambda^2 \Delta f}\right)^2$$

where $\tau$ is the clock pulse width, D' is the net cavity dispersion slope, $N_{ch}$ is the number of multiplexed channels in the input signal, c is the velocity of light, $\lambda$ is the recovered clock wavelength and $\Delta f$ is the channel spacing. Active stabilization could be incorporated to compensate for environmental fluctuations which could affect the virtual cavity length. Provided some residual dispersion exists in the cavity, accompanied by excess self phase modulation to broaden the pulse spectrum slightly, then within its allocated channel, each recovered clock may slightly adjust its operating wavelength (and hence effective cavity length and so relative phase) to ensure maximum gain. This process is analogous to guiding filtering within soliton transmission systems, the stable operating point in this case being whichever wavelength gives the correct phase. The cavity dispersion should be carefully chosen such that several $\pi$ of phase adjustment are available to the laser whilst maintaining good phase matching at the level of the data rate. In the case of phase sensitive amplification, this ensures phase matching to both the clock (radio frequency) phase of the data signal, and the optical phase of the optical carriers.

For a longer cavity, the quadratic dependence of the group delay precludes the correct cavity adjustment for simultaneous wavelengths. In this case, dispersion compensation could also be employed to enable correct cavity length adjustment for a greater range of simultaneous signal wavelengths, for example using a fiber having mirror image dispersion characteristics to those of the dispersion-shifted fiber.

In order to suppress spontaneous noise generated through spontaneous processes within the cavity and through parametric amplification of incoming amplified spontaneous emissions (ASE), the net small signal gain should be maintained below unity. Under these circumstances, several circulations of the idler waves around the cavity are sufficient to allow stable clock recovery.

The parametric amplification process is instantaneous, and so the full saturated output power is available at any given time. So in single channel operation, the energy of each pulse is stabilized by the gain medium. This is in contrast to the case of doped fiber amplifiers, where the long lifetime precludes pulse stabilization by these means, leading to instabilities in the pulse amplitudes. The instantaneous gain may also stabilize the clock pulse amplitudes in the case of multi-channel operation. However, it is possible that two clock pulses may be present simultaneously, giving rise to small levels of saturation induced crosstalk, and potential amplitude instability. To combat this, the cavity could include a weak periodic filter, such as an etalon (parallel plate interferometer), with a free spectral range equal to the wavelength spacing of the channels. In combination with self-phase modulation induced spectral broadening, the spectral compression offered by such a filter would tend to stabilize the pulse amplitudes.

Stimulated Billouin scattering (SBS) sets a severe limitation on the pump power levels that may be propagated in an optical fiber. The threshold for SBS is typically tens of milliwatts, whilst the threshold for parametric amplification is of the order of a few hundred milliwatts. To alleviate this constraint, the fiber may be designed in such a way as to increase the SBS threshold, allowing increased power levels. Alternatively, the signal could be provided with some degree of phase modulation to increase the spectral width of the pump light beyond Brillouin gain bandwidth (~80 MHz). However, in this case it is necessary to maintain a well-defined phase relationship between the three signals. Consequently, any phase modulation designed to reduce SBS must take this requirement into account. This may be achieved by modulating the phase of the pump at an integer multiple of the frequency of circulation of one of the optical signals through the cavity, for example at the bit rate of the signal.

A second constraint relates to the amplitude of the phase modulation. Due to the walk-off between the data and pump signals over the length of the amplifier, the phase matching will be reduced. Indeed, for a $\pi$ phase change the amplification will be transformed to attenuation with disastrous results. Ideally, the peak phase shift along the length of the amplifying fiber will be a small fraction of $\pi$. This implies either that the amplitude of the applied phase modulation is less than $\pi$, or that the amplifying fiber represents a small fraction of the overall cavity length and the modulation frequency matches the cavity round trip.

In view of the rather long overall cavity length, the fiber laser output is inherently unstable owing to fluctuations in the signal polarization state caused by mechanical vibration and temperature variation, as well mode competition between the two orthogonally polarized modes. In order to eliminate noise coming from the polarization fluctuations and mode competition between orthogonally polarised modes, the laser cavity may be constructed entirely with polarization maintaining (PM) fibers and PM components. The axes may be swapped at regular intervals to reduce walkoff, if necessary. The polarization sensitivity of the parametric gain ensures that the recovered clock polarization is matched to the incoming signal polarization.

Figure 2:
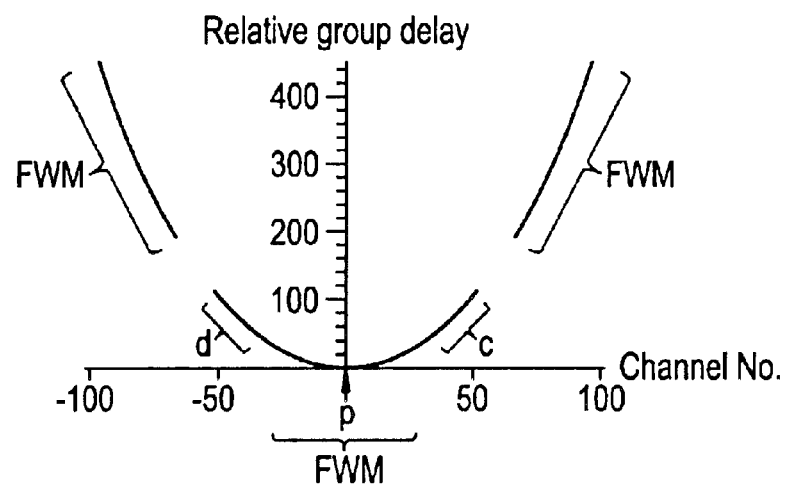
FIG. 2 is a design chart for a parametric amplifier.

The parametric amplifier should be designed to reduce crosstalk, both from the parametric amplification itself and from other four wave mixing components. FIG. 2 illustrates a set of operating parameters which would reduce crosstalk. If the signals (incoming data signals marked d and recovered clock signals marked c) are located within a band of width N, which is offset from the pump wavelength p by a spacing of at least 2N, then all four wave mixing products originating from any two signals and the pump fall into the zones marked FWM. There are two beneficial consequences to this design:

(i) the signals fall outside the wavebands for either the data or the clock;
(ii) the signals are poorly phase matched, and so are of low intensity.

Figure 3:
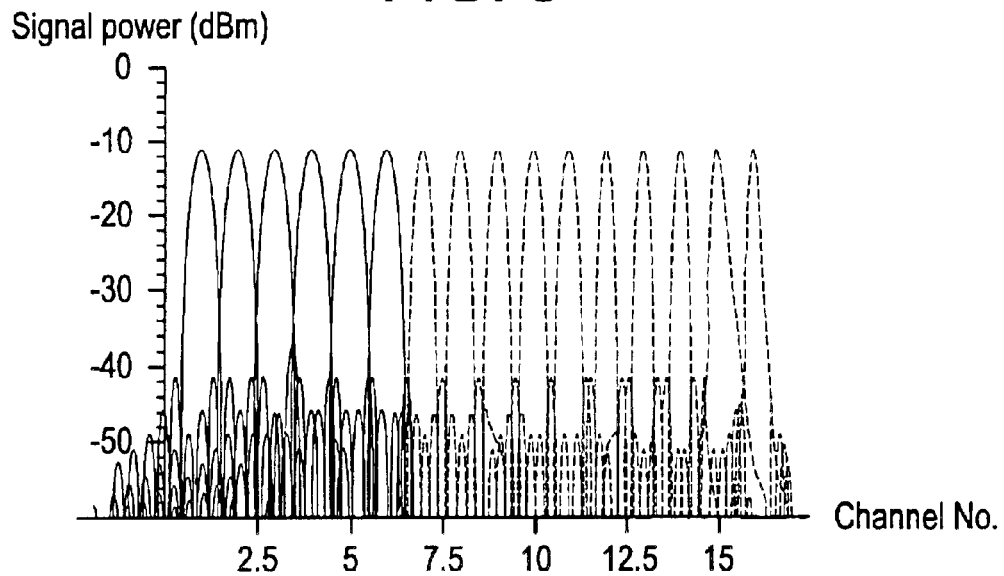
FIG. 3 displays the gain profiles excited in the parametric amplifier of FIG. 1.
Figure 4:
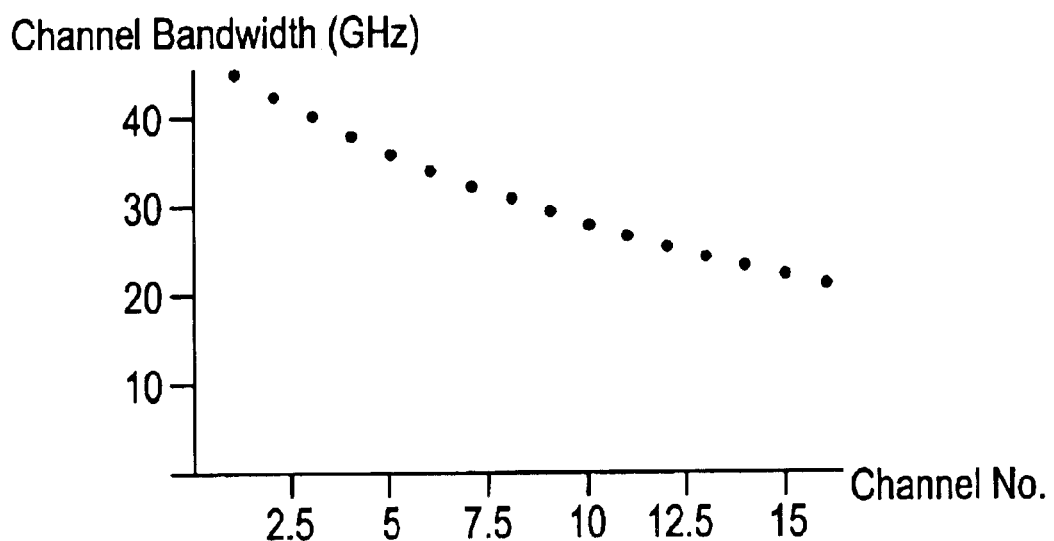
FIG. 4 shows the channel bandwidth of the parametric amplifier of FIG. 1.

Four wave mixing between three data (clock) signals or two data (clock) signals and a clock (data) signal will fall into the signal band. However, since the intense pump is not involved, the intensity of the generated signals will be low. The parametric gain bandwidth depends upon the phase matching conditions, and the parametric amplifier must be designed to take this into account. The available gain bandwidth for each of 16 WDM channels distributed according to FIG. 2 is illustrated in FIG. 3. In this figure, the generated idler intensity is plotted for each potential data signal in turn after a single pass through the loop using the following parameters: non-linear coefficient 8 $W^{-1}$ $km^{-1}$; pump power 500 mW; data peak power 100 mW, channel spacing 100 GHz, dispersion zero 1550 nm, dispersion slope 0.075 $ps.nm^{-2}.km^{-1}$; 16 channels and 1 km dispersion-shifted fiber length. This represents the gain bandwidth of each channel, and demonstrates a design with little or no inter-channel crosstalk, suitable for use in a WDM signal-processing device. However, the channel bandwidth reduces with increasing channel number (see FIG. 4) as the increasing background dispersion coefficient results in a more rapid loss of phase matching with detuning. To achieve this low crosstalk level, it is necessary to have a dispersion slope above a certain critical value, and there is clearly a trade-off between channel bandwidth and crosstalk.

Figure 5:
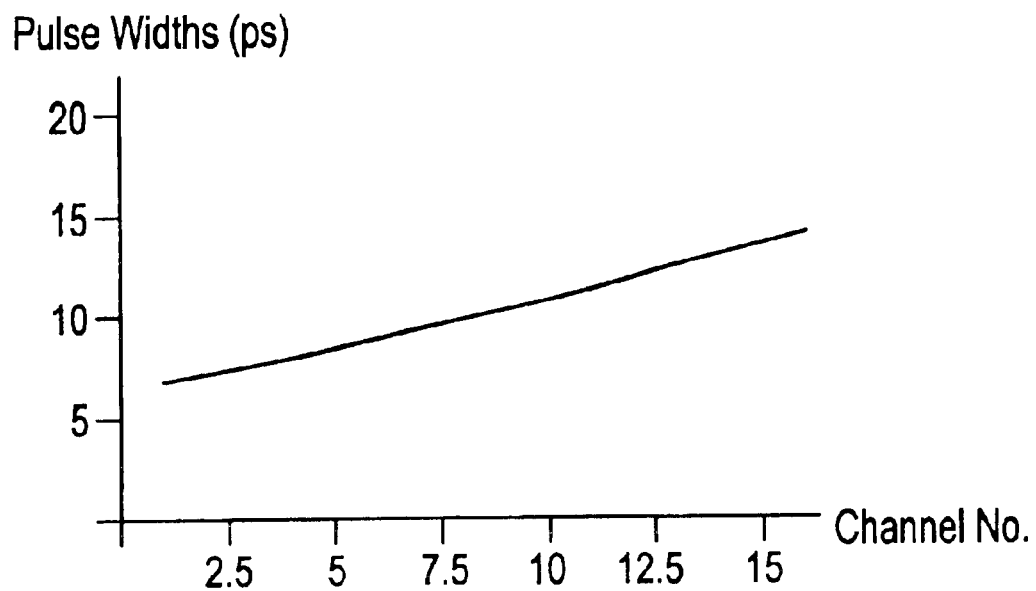
FIG. 5 shows the pulse widths attainable from the parametric amplifier of FIG. 1.

For this amplifier design, the obtainable recovered clock pulse widths (assuming RZ data with a 50% duty cycle and sinusoidal pulse profiles) can be calculated either by simply considering transform limited pulses with spectral widths equal to the gain bandwidth, or by using standard mode locking theory. This is illustrated in FIG. 5, where clearly acceptable performance is achieved for operation at 10 or 20 Gbit/s with a 100 GHz channel spacing. It is notable that this example requires a maximum wavelength shift from channel 1 to channel 16 of 75 nm at 10 Gbit/s with 100 GHz spacing. Alternatively, each regenerator site could contain a small number of such parametric regenerators to reduce the number of channels and so alleviate the parametric gain bandwidth requirement at each site. The group velocity dispersion experienced by high channel numbers may be minimised by reducing the dispersion slope. The optimum dispersion slope, taking the two constraints into account, can therefore be determined.

Figure 6:
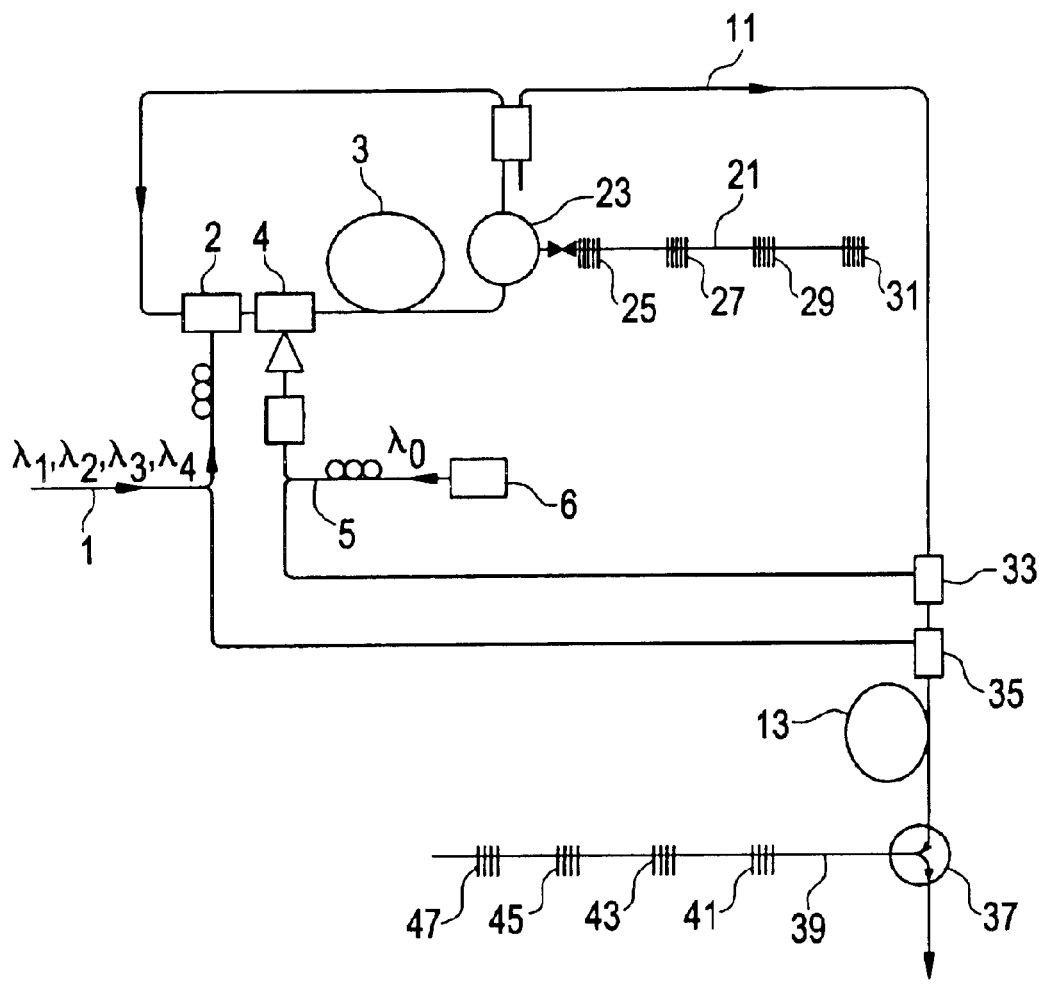
FIG. 6 is a schematic diagram of a multi-wavelength parametric amplifier-based 3R regenerator according to the invention.

A second parametric amplifier may be used to facilitate an interaction between the data signal and the recovered clock to provide a regenerator capable of re-amplifying, re-shaping and re-timing wavelength division multiplexed optical signals as shown in FIG. 6. The regenerator shown employs a second embodiment of a clock recovery circuit according to the invention. The same reference numerals as those used in FIG. 1 are used to indicate components common to both embodiments, and these do not require further description. The principle difference between the clock recovery circuit of the device shown in FIG. 6 and that of FIG. 1 is that the band-pass filter 7 and adjustable fiber delay line have been replaced by an optical branch 21 connected to the optical cavity between the dispersion-shifted fiber 3 and the clock output fiber 11 by means of an optical circulator 23. The optical branch 21 presents a series of cascaded chirped fiber Bragg gratings 25, 27, 29, 31, each of which is positioned at a carefully selected location along the optical branch 21 as described below and designed to reflect radiation of a particular wavelength corresponding to a respective WDM channel.

As described above with reference to FIG. 1, the pump input fiber 5 feeds pump radiation from pump laser 6 into the length of dispersion-shifted fiber at the wavelength of zero-dispersion via a wavelength division multiplexer 4. On start up, RZ WDM data signals are fed to the signal input fiber 1, and these pass into the dispersion-shifted fiber 3 via another wavelength division multiplexer 2. As the pump radiation and data signals pass through the dispersion-shifted fiber 3, idler waves corresponding to the different WDM signal channels are generated symmetrically about the pump wavelength and amplified as described above. After passage through the dispersion-shifted fiber 3, the idler waves, remaining pump radiation and original WDM data signals pass into the optical branch 21 via the optical circulator 23. Each Bragg grating reflects idler wave radiation corresponding to a particular WDM channel (a restored channel clock signal) and passes through light at all other wavelengths, including the remaining pump radiation, the original WDM data signals and any amplified spontaneous emission and four wave mixing terms, which eventually leave the laser cavity. The restored channel clock signals are thus reflected back to the circulator 23 and fed back towards the clock output fiber. A proportion of the restored channel clock signal radiation is re-circulated to the dispersion-shifted fiber 3, while the remainder passes to the clock output fiber 11.

The clock output fiber 11, together with part of the signal input and pump power from the clock recovery circuit are coupled via further wavelength division multiplexers 33, 35 to a further optically pumped amplifier comprising a length of non-linear fiber 13 followed by a further circulator 37 and optical branch 39 presenting a further series of cascaded chirped fiber Bragg gratings 41, 43, 45, 47, designed to reflect radiation of a particular wavelength corresponding to respective WDM channels. The recovered clock may thus be used to modulate the gain experienced by the data signal through four wave mixing as the signals propagate through the further length of non-linear fiber 13, so providing a re-timed and reshaped signal. In this case, each Bragg grating reflects radiation of a particular restored WDM channel and passes light at all other wavelengths, including the remaining pump radiation, the recovered clock and any amplified spontaneous emission and four wave mixing terms, out of the circuit, so filtering out light at such other wavelengths. Alternatively, the data may be used to modulate the low jitter recovered clock signal to provide a wavelength-converted, re-timed and reshaped signal. In this case each Bragg grating reflects radiation at a particular recovered clock wavelength (a wavelength-converted restored WDM channel) and passes light at all other wavelengths, including the remaining pump radiation, the original data signal and any amplified spontaneous emission and four wave mixing terms, out of the circuit.

The use of chirped fiber Bragg gratings in this manner presents a number of advantages. The position of each chirped fiber Bragg grating along the optical branch 21 of the clock recovery circuit defines a unique laser cavity length for its own recovered clock signal. This means that there is no need to have a total cavity dispersion exactly equal to zero. If necessary, variable delay lines (for example in the form of fiber stretchers) can be provided between Bragg gratings (not shown) to adjust each of the individual cavity lengths.

The chirped fiber Bragg gratings combine the functions of reflection and spectral filtering. Individual reflection peaks can be easily adjusted by straining or temperature-tuning corresponding Bragg gratings.

Because nonlinear effects in silica-based glass are relatively weak, a long length of fiber (typically, hundreds of meters) is needed in order to let the system operate at reasonable power levels for both pump and signal light. As a consequence, the fiber laser operation is inherently unstable owing primarily to the cavity length changes caused by temperature variation. The insertion of the CFBGs into the cavity enables the laser to maintain synchronism with an external signal bite rate automatically. Since the grating is chirped, the effective reflection plane position depends on the wavelength. As a result, a small change in the cavity length or the group velocity of light can be compensated by a small shift of the lasing wavelength.

For a particular bit rate f the minimum CFBG length needed to passively stabilize the laser operation can be estimated from the following inequality:

$$\frac{nf\Delta\lambda}{c}\left(\frac{2}{D_g} - cDL_c\right) \geq 1 \quad (1)$$

where n is the effective refractive index, c is the velocity of light, □ □ is the total chirp of the CFBG, D is the dispersion parameter of the cavity fiber, $L_C$ is the laser cavity length and $D_g$ is the dispersion parameter of the grating, approximately given by $$D_g = \frac{\Delta\lambda}{L_g} \quad (2)$$

where $L_g$ is the length of the grating. Since for maximum FWM gain parametric laser needs to be pumped close to the fiber zero dispersion point, D is typically very small, the second term in parentheses can be neglected and (1) simplifies to:

$$\frac{2nfL_g}{c} \geq 1 \quad (3)$$

which has a very simple interpretation—the CFBG needs to be at least half as long as the physical spacing of two optical pulses in the fiber following at the signal clock rate. In this case, reflection from one end of the grating is delayed in respect to the reflection from the other end of the grating by a full bit period, and phase change of ±180° for the recovered clock signal can be attained by a wavelength shift.

The parametric gain bandwidth is determined by the spectral width of the corresponding incoming RZ signal. Therefore, in case of the incoming RZ consisting of perfect transform-limited optical pulses, any wavelength change in the restored clock signal would mean a significant decrease in the available gain. However, real transmission line signals will always be slightly broadened by transmission fiber nonlinearities, and they will experience additional spectral broadening due to the intra-channel FWM and self-phase modulation in the clock recovery amplifying fiber itself. We estimate that at least a 0.2 nm wavelength shift without a significant drop in the parametric gain should be permissible for the 40 GHz clock rate.

Another important point relates to grating dispersion. For the 1 cm long grating (the minimum length needed to stabilize the 10 Gb/s clock recovery, as shown above) with a total chirp of 0.2 nm, the grating dispersion would be roughly 500 ps/nm. It might seem that such a large dispersion would make circulation of a short pulses in a laser cavity impossible. The following simple illustration shows that this is not necessarily true. Let us consider a monochromatic optical wave sinusoidally modulated with 100% modulation depth, which is the simplest form of a clock signal:

$$P = A(1+\cos \Omega t)\cos \omega t \quad (4)$$

where ω is the carrier frequency and Ω is the modulation (clock) frequency. As is well known, the spectrum of this signal is represented by the main peak at carrier frequency and two additional peaks at ±Ω, which can be shown by the transformation of (4):

$$P = A\cos\omega t + \frac{A}{2}(\cos(\omega + \Omega)t + \cos(\omega - \Omega)t) \quad (5)$$

When this signal is reflected from a chirped grating, effective reflection planes for all three spectral components will be different. At least for the case of linearly chirped grating, the amount of phase shift θ of frequency sum and difference components in respect to the carrier frequency component will be the same with an opposite sign. The resulting signal is represented by:

$$P_{refl} = A\cos\omega t + \frac{A}{2}(\cos((\omega + \Omega)t + \theta) + \cos((\omega - \Omega)t - \theta)) \quad (6)$$

which is easily transformed into:

$$P_{refl} = A(1+\cos(\Omega t+\theta))\cos \omega t \quad (7)$$

As is evident from (7), reflection of our simple example signal from a chirped grating, no matter how large the dispersion, results in a phase shift of the modulating signal, but does not cause the distortion or change the shape of that modulating signal.

In a practical mode-locked laser, large cavity dispersion can cause the laser output pulses to be chirped. But, this can be easily corrected by a length of a fiber with the right dispersion sign or a CFBG-based compensator.

For a multi-channel device, due to the wavelength dependence of the parametric gain, recovered clock signals of different channels will normally have different amplitudes. If desired, those amplitudes can be easily equalized by varying the reflection strength of the corresponding CFBGs.

Since the proposed clock recovery device operation is based on parametric amplification, it is desirable to have the pump radiation as close as possible to the zero dispersion wavelength of the amplifying fiber. Operation in the vicinity of zero dispersion, however, will also cause unwanted four-wave mixing between all spectral components present in the laser cavity and result in some amount of inter-channel crosstalk. Since the pump is the most powerful signal in the cavity, the most harmful interference will come from mixing of the pump and recovered clock signals. Therefore, it is undesirable if the pump wavelength is the same as one of the standard channel wavelengths, or if the pump wavelength is separated from any one of the channel wavelengths by an exact multiple of the channel spacing.

Figure 7:
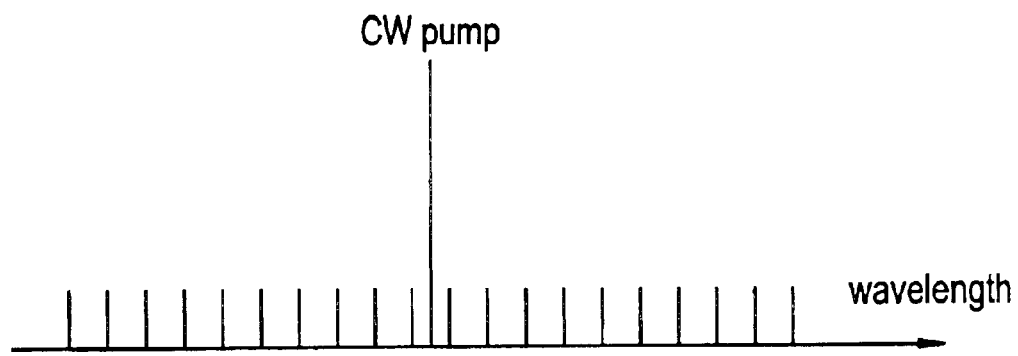
FIG. 7 is an alternative design chart for a parametric amplifier.

The most advantageous position for the pump wavelength is right in the middle between two adjacent channel wavelengths. As an example, the scheme shown in FIG. 7 might be considered, wherein the pump wavelength lies mid-way between two adjacent standard channel wavelengths. This scheme has two additional advantages. First, wavelength space both to the left and right of the pump is used to allow more channels to be recovered. And second, RZ signals and recovered clocks occupy correspondingly odd and even standard channel wavelengths, which means that they can be combined (or separated) by commercially available devices known as interleavers. Of course, the scheme where all RZ signals are on one side of the pump and all recovered clock signals on the other can also be used, but it might still be necessary to only supply every other channel of the WDM system for recovery to minimize excess FWM terms and related crosstalk.

One of the major issues with harmonically mode-locked fiber lasers is so-called supermode noise. In simple terms, with the laser cavity several hundred meters long, longitudinal mode spacing is less than 1 MHz. A lot of supermodes exist within a channel bandwidth, and mode competition among these supermodes causes large amplitude fluctuations of the generated optical pulses. The proposed laser is capable of automatically maintaining synchronism to an external clock despite drifts in cavity length owing to the use of CFBG, even in the absence of interferometric stabilization. Therefore, an optical filter with comb-like transmission and a free spectral range (FSR) equal to the clock frequency or a subharmonic of the clock frequency of the input signals can be inserted into the cavity to select only one or a limited subset of supermodes, thus suppressing supermode noise. The optical filter with comb-like transmission spectrum can be a fiber loop interferometer, conventional Fabry-Perot filter or an FBG-based Fabry-Perot filter.

Instead of dispersion-shifted fiber, the non-linear medium could comprise KTP crystal, a semiconductor optical amplifier or a PPLN as would be clear to those skilled in the art of optical regenerator design.

It will be apparent to those skilled in the art that various modifications to the preferred embodiments of the invention as described herein can be made without departing from the spirit or scope of the invention as defined by the appended claims. Thus, it is intended that the present invention cover the modifications and variations of this invention provided they come within the scope of the appended claims and their equivalents.

What is claimed is:

1. Apparatus for recovering clock pulses of wavelength division multiplexed optical signals passed therethrough, the apparatus comprising:
   (i) an optically-pumped laser cavity formed between a plurality of reflectors to define a cavity length and comprising a nonlinear medium pumped at a wavelength selected to give efficient parametric amplification within said medium, said cavity length corresponding to an integer multiple of bit periods of at least one of the multiplexed optical signals, and said optical signals copropagating through said medium with said pump radiation; and
   (ii) an optical path for recirculating a proportion of the output from said laser cavity back through said laser cavity;
whereby the interaction between the pump wavelength and at least one of said copropagating multiplexed optical signals within the nonlinear medium generates idler waves symmetrically about said pump wavelength by four wave mixing and said idler waves are recirculated through said laser cavity to be amplified by parametric amplification in order to recover wavelength division multiplexed clock pulses.

2. Apparatus according to claim 1, wherein at least one of said reflectors is a wavelength-selective reflector which is partially reflective at the wavelength of at least one of said idler waves for reflecting such idler waves back through said cavity after passage through said cavity.

3. Apparatus according to claim 1, wherein said cavity is formed in a ring laser configuration.

4. Apparatus according to claim 1, wherein said cavity is formed in a Sigma laser configuration.

5. Apparatus according to claim 1, further comprising a filter to prevent further transmission of radiation at said pump and signal wavelengths after passage through said nonlinear medium.

6. Apparatus according claim 5, wherein said filter to prevent further transmission of radiation at said pump and signal wavelengths after passage through said medium comprises a band pass filter within said optical cavity.

7. Apparatus according to claim 5, wherein said filter to prevent further transmission of radiation at said pump and signal wavelengths after passage through said nonlinear medium comprises an optical branch presenting a series of cascaded chirped fiber Bragg gratings, said optical branch being connected to said optical cavity by an optical circulator, whereby each chirped fiber Bragg grating reflects a different idler wavelength back into said cavity.

8. Apparatus according to claim 7, wherein each chirped fiber Bragg grating is at least half as long as the physical spacing of two successive optical pulses in said fiber following at the signal clock rate.

9. Apparatus according to claim 1, further comprising an adjuster for adjusting said cavity length to correspond to an integer multiple of bit periods of at least one of said multiplexed signals.

10. Apparatus according to claim 9, wherein said adjuster for adjusting said cavity length comprises an adjustable fiber delay line.

11. Apparatus according to claim 10, wherein said adjustable fiber delay line is actively stabilised.

12. Apparatus according to claim 1, further comprising dispersion slope compensation within said cavity.

13. Apparatus according to claim 12, wherein said dispersion slope compensation has mirror image dispersion characteristics to those of said nonlinear medium.

14. Apparatus according to claim 13, wherein said dispersion slope compensation comprises at least one fiber grating.

15. Apparatus according to claim 12, wherein said dispersion slope compensation comprises dispersion-compensating fiber.

16. Apparatus according to claim 12, wherein the residual dispersion after dispersion compensation is not zero, and said cavity length at each idler wavelength is equal to an integer multiple of bit periods.

17. Apparatus according to claim 1, wherein the coherence length of the signals is substantially greater than said cavity length.

18. Apparatus according to claim 1, wherein the phase of the pump radiation is modulated at the frequency of circulation of one of said optical signals through said cavity or an integer multiple thereof up to the bit rate of one of said optical signals to suppress stimulated Brillouin scattering.

19. Apparatus according to claim 1, further comprising an optical filter with a free spectral range equal to the signal clock frequency or a subharmonic of the signal clock frequency.

20. Apparatus according to claim 1, wherein said wavelength division multiplexed optical signals occupy respective channels separated from each other by a wavelength spacing, and said apparatus further comprises a weak periodic filter with a free spectral range substantially equal to said wavelength spacing between adjacent channels.

21. Apparatus according to claim 1, wherein said optical cavity comprises polarization-maintaining fiber.

22. Apparatus according to claim 21, wherein said fiber has polarization axes, which axes are swapped at regular intervals.

23. Apparatus according to claim 1, wherein said wavelength division multiplexed optical signals occupy respective standard channel wavelengths, and said pump wavelength lies between two adjacent standard channel wavelengths.

24. Apparatus according to claim 23, wherein said pump wavelength lies mid-way between said two adjacent wavelengths.

25. Apparatus according to claim 1, wherein said signals are located within a band of width N, which band is offset from said pump wavelength by a spacing of at least 2N.

26. Apparatus according to claim 1, wherein said nonlinear medium comprises dispersion-shifted fiber, a semiconductor optical amplifier or a PPLN.

27. Multi-wavelength optical regenerator for recovering and re-timing wavelength division multiplexed optical signals, said regenerator comprising apparatus according to claim 1, wherein wavelength division multiplexed optical signals and said recovered clock pulses are coupled to a further optically-pumped amplifier comprising a nonlinear medium pumped at a wavelength selected to give efficient parametric amplification within the medium, whereby said optical signals and said recovered clock pulses are modulated by each other.

28. Multi-wavelength optical regenerator according to claim 27, further comprising a filter to prevent further transmission of radiation at said pump and signal wavelengths after passage through said cavity and further amplifier.

29. Multi-wavelength optical regenerator according to claim 27, further comprising a filter to prevent further transmission of radiation at said pump and recovered clock wavelengths after passage through said cavity and further amplifier.

30. Method for recovering clock pulses of wavelength division multiplexed optical signals, the method comprising the steps of:

(i) providing a laser cavity formed between a plurality of reflectors to define a cavity length and comprising a nonlinear medium;

(ii) optically-pumping said cavity at a wavelength selected to give efficient parametric amplification within said medium;

(iii) copropagating said optical signals through said nonlinear medium with said pump radiation;

(iv) recirculating a proportion of the output from said laser cavity back through said laser cavity; and (v) adjusting said cavity length to correspond to an integer multiple of bit periods of at least one of said multiplexed optical signals;

whereby the interaction between the pump radiation and at least one of said copropagating multiplexed optical signals within the nonlinear medium generates idler waves symmetrically about said pump wavelength by four wave mixing and said idler waves are recirculated through said cavity to be amplified by parametric amplification in order to recover wavelength division multiplexed clock pulses.

31. Method according to claim 30, wherein said idler waves are partially reflected back through said cavity.

32. Method according to claim 30, wherein said optical signal is subject to excess self phase modulation within said cavity.

33. Method according to claim 30, further comprising compensating signal dispersion within said cavity.

34. Method according to claim 30, wherein the net small signal gain through said cavity is less than one.

35. Method according to claim 30, wherein said wavelength division multiplexed optical signals occupy respective channels separated from each other by a wavelength spacing, said method further comprising weakly filtering with a periodic free spectral range within said cavity substantially equal to said wavelength spacing between adjacent channels.

36. Method according to claim 30, further comprising compensating polarization mode dispersion within the cavity.

37. Method according to claim 30, wherein said wavelength division multiplexed optical signals occupy respective standard channel wavelengths, and said pump wavelength lies between two adjacent standard channel wavelengths.

38. Method according to claim 37, wherein said pump wavelength lies mid-way between said two adjacent wavelengths.

39. Method according to claim 30, wherein said pump radiation is phase modulated to suppress stimulated Brillouin scattering.

40. Method for re-amplifying, re-shaping and re-timing wavelength division multiplexed optical signals, the method comprising the method according to claim 30, and further comprising modulating said optical signals and said recovered clock pulses by each other.

* * * * *